United States Patent [19]

Trimboli Callegari et al.

[11] 4,150,661

[45] Apr. 24, 1979

[54] LAYOUT FOR COLLECTING SOLAR ENERGY APPLICABLE TO ACCLIMATIZING ALL TYPES OF BUILDINGS

[76] Inventors: Marino S. Trimboli Callegari; Antonio A. Trimboli Longetto, both of concha Espina, 63 - Atico, Madrid, Spain

[21] Appl. No.: 790,470

[22] Filed: Apr. 25, 1977

[30] Foreign Application Priority Data

Feb. 11, 1977 [ES] Spain ................................. 455.830

[51] Int. Cl.² ................................................. F24J 3/02
[52] U.S. Cl. ..................................... 126/271; 237/1 A
[58] Field of Search ................. 126/270, 271; 237/1 A

[56] References Cited

U.S. PATENT DOCUMENTS

| | | | |
|---|---|---|---|
| 3,934,323 | 1/1976 | Ford et al. | 126/271 |
| 3,937,208 | 2/1976 | Katz et al. | 126/271 |
| 3,981,294 | 9/1976 | Deminet et al. | 126/271 |
| 4,010,733 | 3/1977 | Moore | 126/271 |
| 4,024,853 | 5/1977 | Gordon | 126/271 |
| 4,049,046 | 9/1977 | Worthington | 126/271 |

*Primary Examiner*—Kenneth W. Sprague

[57] ABSTRACT

A layout for collecting solar energy is described which is made up of modules formed by two or more hollow plates of variable-cross section, placed parallel to each other, in the interior of which a fluid having chemical properties which assist the collection of solar energy flows. The plates are inserted in the mouths of two collectors to which the supply and distribution ducts of the fluid are applied. The collectors have a configuration providing an area or chamber of air separating both plates, and in the opposite side, they have an upper fin, with a "U" cross-section, to fit into the structure of the building, and a lower flange which bears a block made of insulating material placed under the second plate.

9 Claims, 8 Drawing Figures

U.S. Patent Apr. 24, 1979 Sheet 1 of 2 4,150,661
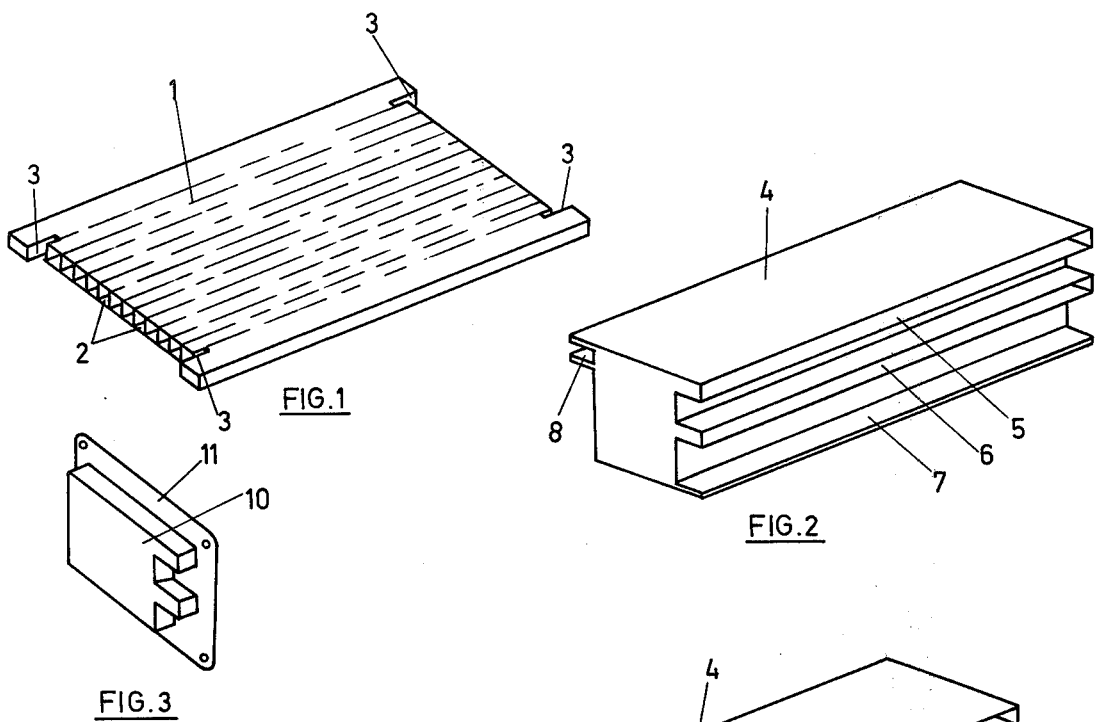
FIG.1
FIG.2
FIG.3
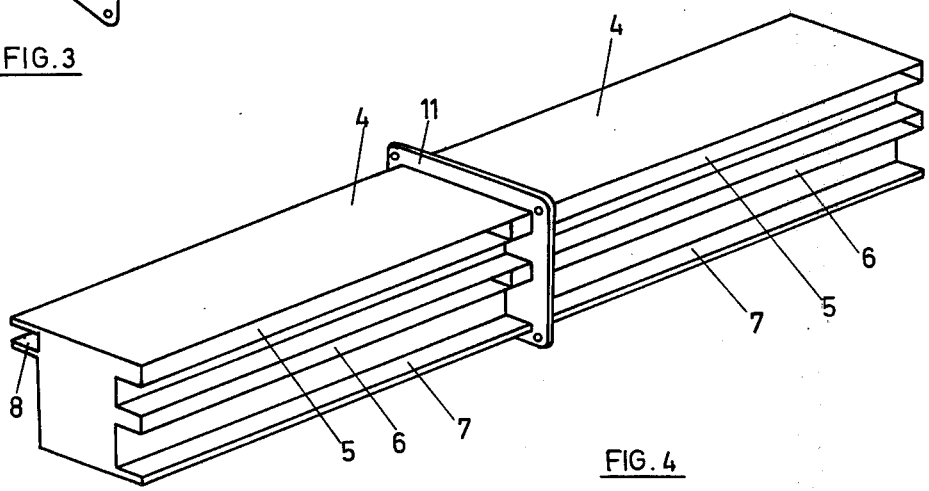
FIG. 4
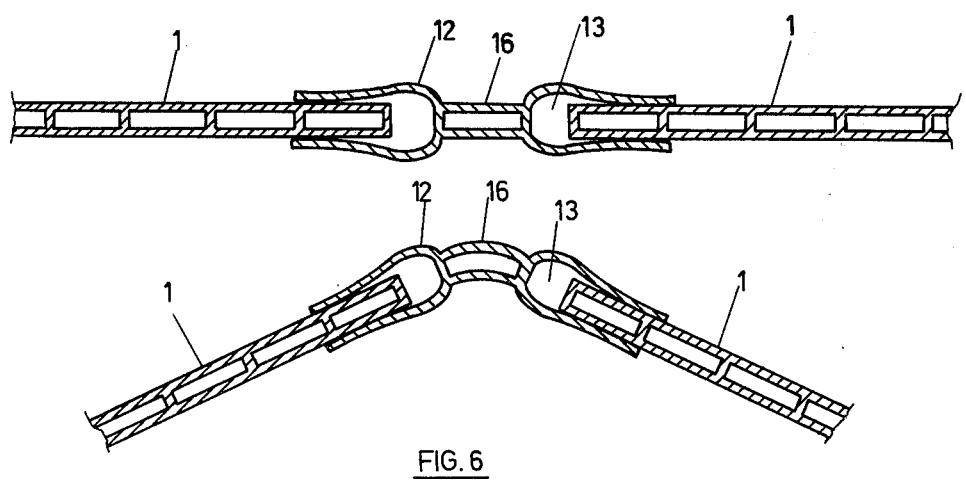
FIG.6

LAYOUT FOR COLLECTING SOLAR ENERGY APPLICABLE TO ACCLIMATIZING ALL TYPES OF BUILDINGS

The object of the present Patent of Invention application refers to a "Layout for collecting solar energy applicable to acclimatizing all types of buildings" which offers essential new characteristics, as well as great advantages over layouts known until now.

The serious energy crises which all countries are experiencing currently have meant an extremely serious problem on a world level which makes it compulsory to continually seek new sources of energy and to carry out constant research on the more rational utilization of same, seeking maximum yield in their application with minimum expense.

Solar energy is frequently the centre of this research and it has been proved that in many cases its use can perfectly replace the sources of energy in which until now engineering has been based.

The layout set forth in the present application has been studied to take advantage of solar energy in acclimatizing any building, either public or industrial, replacing in part or fully, with absolute guarantee, the use of all types of traditional heating systems by electricity, gas, water, etc.

This layout consists in the installation of a modular plate system with suitable technical characteristics for collecting and retaining the solar energy forming the ceiling or walls of the building, said plates being able to have a variable cross-section but, in all events, they are hollow, so that inside there is a chemically studied fluid so that its properties assist the specific function of the invention.

The plates mentioned above can be mass produced and subsequently cut according to the dimensions of the module to be used, thereby considerably reducing the manufacturing and installation cost of the layout, aspect which is furthermore enhanced by the fact that this installation can be made built into the actual structure of the building, or can be perfectly adapted to public buildings or industrial bays already built.

Each module can be equipped with two or more plates placed parallel to each other, although the most common installation will be of two plates linked to a common collector which also has inside it the same fluid as the former. This collector can be either closed or open at the ends, as best suits the installation; in the latter case, a suitable stopper is adaped to it, which can be provided with a flange to be joined to another adjacent collector, thereby reducing the use of large quantities of unnecessary metal structures.

The configuration of these collectors means that between the plates there is a separate air compartment which separates them, also having a "U"-shaped fin in the side opposite the plates, which facilitates the installation of the device and a lower projection in which a body rests made of insulating material, placed under the lower place, and separated from it by a microinsulating reflexive sheet to avoid loss of energy.

The characteristics regarding the shape of these collectors also admits the possibility that the supply ducts and fluid circulation can be adapted by three different zones, an advantage which no doubt is very worth while, due to the installation convenience involved.

The function of the plate placed outside, i.e. that which first receives the sun's rays, is to let them pass through it, increasing the temperature of the fluid contained inside it. Naturally, this plate must be translucent and the fluid it contains must allow the sun's rays to pass, whatever its chemical composition.

Under this receiver plate, there is a free area which separates the said plate from the one below, which is hollow like the first one, and is filled with the same type of liquid. This lower retaining plate has the basic characteristic of not letting the sun's rays pass through it, either by being made of a black material or this material, although it is not black, retains the aforesaid rays by virtue of certain chemical and physical characteristics it possesses. It should therefore be pointed out that in the aforementioned free zone separating both plates, only occupied by air, there appears a hothouse effect, by all the heat produced by the solar energy condensing in it, since by the rays passing the first plate and being retained by the second, the calorific energy produced is stored in that area by the existence of the actual initial receiver plate, which prevents it escaping outside.

This stored energy heats the fluid existing inside both plates, which flows through the actual collectors, by a series of ducts adapted to the former which form the complete network of the installation and which are duly communicated with a generating set suitable for transforming this calorific energy in electric energy, from which it can be distributed to the whole of the building.

The arrangement of these plates can also offer the possibility of a dual collection of solar energy, as if the hothouse effect is not wished to be obtained, which has been commented on, the lower plate can be replaced by another translucid plate with similar characteristics to the initial one, thereby doubling the collecting power of the device. To increase this collecting power, it should be quoted that the initial receiver plate may possibly have a structure made up of a succession of small Fresnel Lenses, to ensure a much greater concentration of rays.

The same collecting function of the solar energy can be achieved if there is only air in the initial translucid plate, the same as in the area between both plates. In this case, the structure of the collectors has an intermediary partition wall which separates the liquid fluid flowing through the lower air plate and which is distributed at the same pressure between the main area and the upper translucid plate, a regulating gate having been provided, of the traditional sliding type, or the like, in the collector wall which faces outside so that by handling it, the amount of cold air can be inserted in the former, necessary to maintain an ideal temperature in every case and time of the year.

As can be deduced from these comments, the function of the device is fulfilled perfectly in any of the embodiments chosen, the fluid flowing through the plates and collectors being either liquid or air.

We must also point out that when the lower non-translucid plate acquires a given temperature, it starts to emit heat, which is deposited, on the one hand, in the intermediate central area, and on the other, it is transmitted to the insulating body placed under the aforesaid plate, it being particularly important to place between both a fine sheet of microinsulating material, one of whose sides has reflexive power and placed against the plate, so that the infrared rays emitted by the latter are reflected in the sheet and return to the said place, thereby avoiding considerable loss of energy.

FIG. 1 is a perspective view of one of the plates.
FIG. 2 is a perspective view of one of the collectors.

FIG. 3 is a perspective view of one of the caps.

FIG. 4 shows two collectors joined together.

FIG. 6 is a cross sectional view of two modules.

Figure 5:
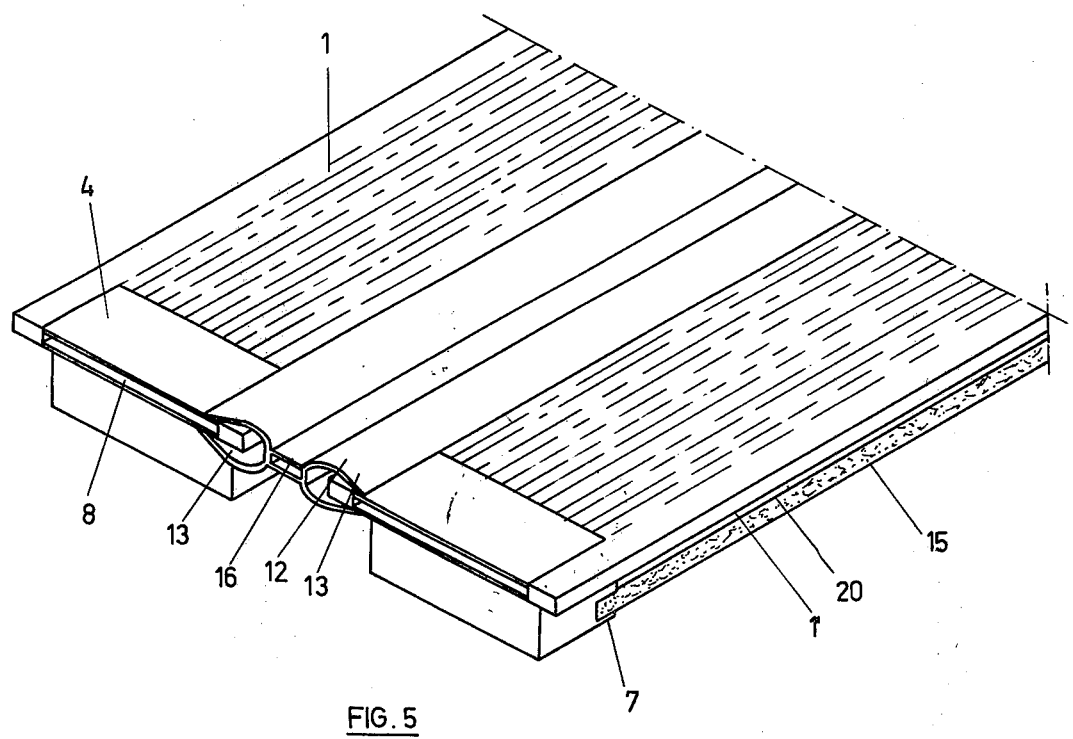
FIG. 5 is a perspective view of two modules joined together.

Nevertheless, in order to set forth more clearly the object of the present Patent of Invention application, reference is going to be made in the following detailed description to the annexed drawings in which, simply by way of example, and not of a limiting nature whatever, a preferred form of embodiment of the invention has thus been shown.

In the drawings, FIG. 1 represents a perspective view of one of the plates -1- in which inner cavities can be seen -2- which they have, through which the aforementioned fluid flows, as well as the inlets -3- for fitting into the collector.

FIG. 2 shows the perspective view of one of the collectors -4- in which the mouths -5- and -6- can be seen, where the plates -1- are inserted on assembling the device, together with the lower flange -7- in which the insulating material rests and the "U" projection -8- placed on the opposite side of the aforesaid mouths, which enables the collector to be fixed to the structure of the building or, through an additional part, to join two consecutive collectors. In this aspect, there is the possibility of the collectors being open at the ends, in these cases, a cap has been provided, duly adapted to the actual shape of the collector which may or may not have a flange for the successive joining of several collectors by the same system, thereby achieving as large a surface for collecting energy as wished, the considerably reducing the use of metal structures on assembling the whole device.

FIG. 3 represents one of these caps -10- whose shape is identical to the cross-section of the collectors, to prevent any air or liquid escaping; these caps may or may not have a flange -11- which enables as many collectors as are needed for each particular installation to be joined.

FIG. 4 shows the joining of two consecutive collectors -4- through the flanges -11- of the opposing caps -10-. All the details of the collectors can be seen in this figure exactly the same as in FIG. 2.

In FIG. 5 a concrete arrangement of the invention has been represented, formed by joining two modules by means of the additional part quoted in the description of FIG. 2. It can indeed be seen that said part -12- firmly links both modules since the ends of the plates -1- fit into the hollow wing flaps -13- of the former, being on the same level as the "U" projections -8- of the collectors -4- so that the support or join of the device to the structure of the building is correct. It should also be noticed in this figure how both plates -1- and -1'- (the lower non-translucent one) are fitted into the pertinent mouths of the collectors, leaving the free area -14- of air between both, which has the effect of a hothouse and under the non-translucent plate -1'-, the block of insulating material -15- can be seen, resting in the lower flange -7- of the collector.

In FIG. 6 a cross-section has been shown of the additional part -12- used to join the different modules formed. The aforementioned additional part can also be mass produced, like the previous ones and has a main area -16- provided with an elasticity index suitable to enable it to be used as the headpiece of a complete roof, formed by these modules (see lower drawing of this same Figure), or as a simple join of two modules in the same plane, as shown in the upper drawing. The link is made by inserting in the hollow wing flaps -13- which the said part -12- has, the sides all along the plates -1- as shown in the drawings, thereby being able to join by this method as many modules as are needed to completely roof the building or industrial bay in question, always, naturally, within the calculated resistence limits of the device.

Figure 7:
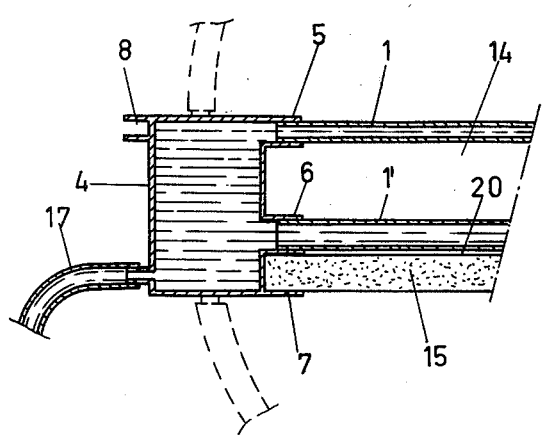
FIG. 7 is a cross sectional view of a plate and collector.

FIG. 7 shows a cross-sectional detail of the device once made up, in the concrete case of there being fluid in both plates, and in the collectors; the transparent plate -1- can be seen which in the first place receives the sun's rays letting them pass through it, and plate -1'- with similar characteristics as the previous one, but made of a nontranslucent material, or whose properties do not allow the rays to pass through it. Between both plates, the free area -14- can be seen, occupied only by air and with the function of a hothouse, already mentioned, while below, there is the block -15- made of insulating material, resting on the flange -7- of the collector and separated from the plate -1'- through a fine microinsulating sheet -20- with its reflexive surface opposite the said plate.

The shape characteristics of the collector -4- mean that the ducts -17- for the supply and flow of the fluid, can back onto the aforesaid collector in several areas, as shown by the dots, thereby achieving great advantages when setting up the installation more conveniently. Obviously in the cut end of the plates -1- and -1'- there is an arrangement exactly the same as that shown in this Figure, but it has been dispensed with in the drawing, to make it clearer.

Figure 8:
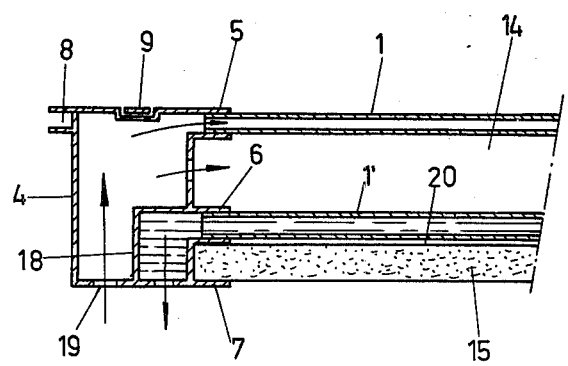
FIG. 8 is a cross sectional view of a modification of the plate and collector.

In FIG. 8 a cross-sectioned detail has also been represented of the device but in the concrete case that the translucent plate -1- does not contain any type of liquid. It should be noticed that the structure of the collector -4- has varied by inserting an inner partition wall -18- whose function is to separate the fluid flowing through the plate -1'- from the air which goes in or leaves the collector through the mouth -19- communicated with the supply and distribution ducts. This air occupies the intermediate chamber -14- and inside the plate -1-; the regulating gate -9- can also be seen, in direct contact with the outside, which, when operated at a given moment, can vary the temperature obtained throughout the arrangement, by allowing a larger or smaller amount of cold air to go into the collector.

Finally, we can add that this same hothouse function is achieved if the plates -1- and -1'- have their ends closed, thus preventing the fluid they contain flowing freely, although this would occur in very special cases and provided the calculations and characteristics of a concrete layout of the invention so calls for it.

Likewise, the modular layout, as it has been disclosed, can be developed in practice, placing the different modules consecutively one after another, or parallel to each other, one under another, provided the upper plates are translucent.

We think that after this detailed description, the object of the present Patent of Invention has been made sufficiently clear, hence it only remains to state that within the essential novelty it furnishes, there are innumerable variations in detail, likewise protected, provided these modifications do not alter the real fundamental principle of the invention.

After making the description of the present invention what is declared as new and our own invention comprises the following claims:

1. A modular unit for heating a building or the like which consists essentially of at least one upper and one lower hollow plates arranged parallel to each other, a fluid placed within the plates, said fluid being suitable to collect solar energy, a common collector for engagement with said plates, means for engaging the plates with said common collector, an air chamber between said plates, a block of insulating material placed under the lower plate, in said collector, a microinsulating sheet between said block of insulating material and said lower plate, said microinsulating sheet being placed with the side facing the lower plate having a reflective surface and means for connecting said module with said building.

2. The module according to claim 1 wherein the upper plate is translucent to let solar rays go through and the lower plate does not let solar rays go through.

3. The module according to claim 1 which additionally includes cap means for closing the ends of the collector.

4. The module according to claim 3 wherein said cap means are provided with flanges for joining to a second collector.

5. The module according to claim 1 wherein both plates are translucent, the fluid is air, and the collector has an intermediate partition wall separating the lower plate from the air chamber.

6. The module according to claim 1 wherein said fluid is air.

7. The module according to claim 1 wherein said means for engagement of the plates with the collector consists of grooves in the collector, flanges in the plates and the flanges engage with said grooves.

8. The module according to claim 1 wherein the collector is provided with a U-shaped fin for connection with said building.

9. The module according to claim 1 additionally including ducts for communication with a generating set and transforming heat into electric energy.

* * * * *